J. V. CIZEK.
END GATE.
APPLICATION FILED FEB. 28, 1916.

1,193,514.
Patented Aug. 8, 1916.

Witnesses
Geo. P. Carpenter
Ben G. Swab

Inventor
John V. Cizek
By J. M. St. John
Atty.

UNITED STATES PATENT OFFICE.

JOHN V. CIZEK, OF CLUTIER, IOWA.

END-GATE.

1,193,514.  Specification of Letters Patent.  Patented Aug. 8, 1916.

Application filed February 28, 1916. Serial No. 80,823.

*To all whom it may concern:*

Be it known that I, JOHN V. CIZEK, a citizen of the United States, residing at Clutier, in the county of Tama and State of Iowa, have invented certain new and useful Improvements in End-Gates; and I do hereby declare the following to be a full, clear, and exact description of the invention, such as will enable others skilled in the art to which it appertains to make and use the same.

This invention relates more particularly to farm wagons, and the object of the invention is to provide an end-gate for such wagons, adapted for the easy and speedy discharge of grain and the like, and capable of being opened as much or little as desired, to regulate the flow of material.

The invention is fully disclosed in the description and claims following, reference being had to the accompanying drawing, in which:—

Figure 1:
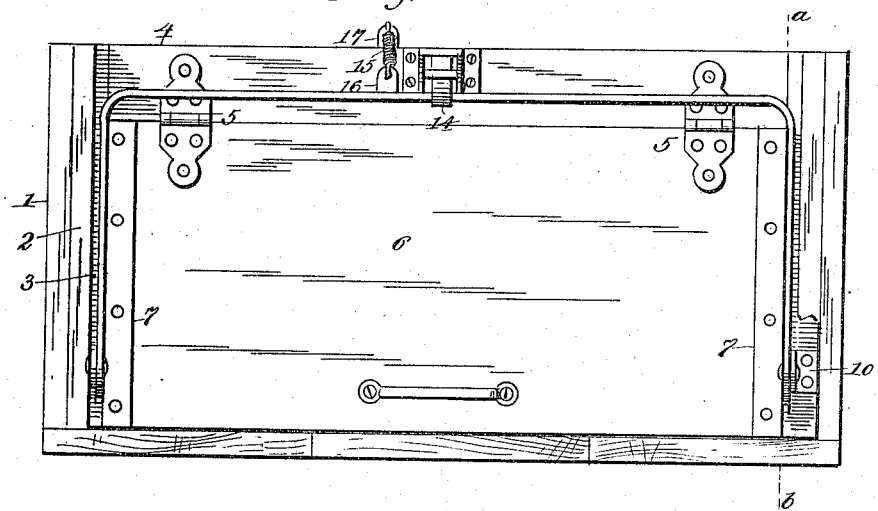
Figure 2:
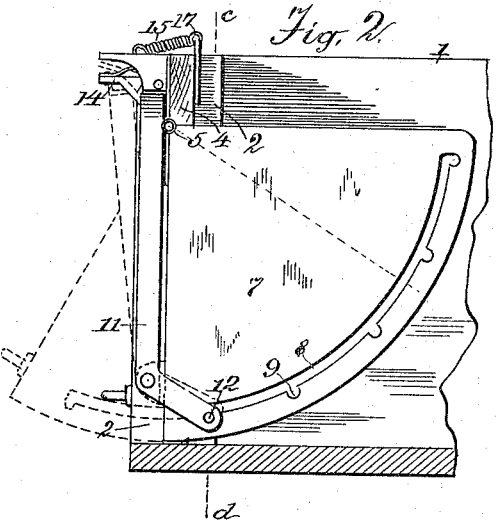
Figure 3:
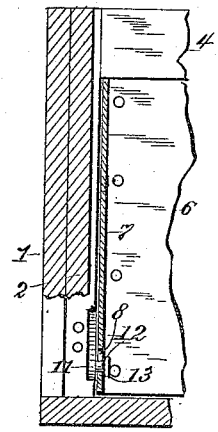

Figure 1 is a rear elevation of my improved end-gate as in use. Fig. 2 is a side view of the same as it appears to the left of section line $a\,b$, Fig. 1. Fig. 3 is a fragmentary view from the inner side, in the plane of section line $c\,d$, Fig. 2.

In the drawing the numeral 1 designates a wagon body of a familiar type, provided with the usual cleats 2 to retain the endboard. Between these cleats rests the endgate, described as follows: A rectangular frame holds the movable portion of the gate, and is in turn held in position between the cleats. This frame is composed of a pair of uprights 3 connected at the top by a cross-bar 4 suitably secured thereto. To the under side of this cross-bar is hinged at 5 an endboard or gate 6, so as to swing outwardly, as indicated by the dotted lines in Fig. 2. To the ends of the gate are secured, as by riveting, two sector-plates 7, provided with curved slots 8 and offset notches 9. Near the lower ends of the uprights are secured ears 10, and to these is pivoted a bail 11 slightly wider and higher than the gate. The legs of this bail are bent inwardly, as shown in Fig. 2, and near their inner ends are provided with studs 12 passing freely through the curved slots above mentioned. The studs should preferably have heads 13 to keep the bail and sector wing from separating. When in holding position with respect to the sector the upper portion of the bail lies close to the upper cross-bar, and is held from displacement by a latch 14. The bail is also provided with a spring 15 whose tension tends to draw the bail to locking position with respect to the end-gate. The spring may be a simple coil, as shown, connected to lugs or brackets 16 and 17 attached to the bail and cross-bar respectively.

The gate is opened by releasing the latch and drawing the upper portion of the bail outwardly. The bail may be used as a brake, as soon as released from locking engagement with the sector, either by pulling outwardly or pushing inwardly. If left free, after first releasing from engagement with the sector, the spring will cause it to engage with the next notch as the gate swings outwardly.

It is to be noted that the sector wings serve not only to hold the gate in proper position, but as side-boards to confine the outflowing material sidewise. This is an important feature, especially in dumping the wagon's contents into the receiving hopper of an elevator.

Having thus described my invention, I claim:

1. An end-gate, comprising a three-sided frame, a gate hinged to the upper cross-bar of the frame, notched sector-wings attached to the ends of the gate, and a bail hinged to the frame uprights, and with inwardly extending arms adapted to engage with the notches of the sector-wings.

2. An end-gate, comprising a three-sided frame, a gate hinged to the upper cross-bar of the frame, sector wings attached to the ends of the gate, and slotted in arcs concentric with the hinges, with notches leading from the slots, a bail hinged to the frame uprights, the extended inner ends of bail being provided with studs positioned in said slots, and means adapted to hold the bail in locking position.

3. An end-gate, comprising a three-sided frame, a gate hinged to the upper cross-bar of the frame, sector wings attached to the ends of the gate, and slotted in arcs concentric with the hinges, with notches leading from said slots, a bail hinged to the frame uprights, the inner ends of the bail being provided with studs to engage said slots and notches, and tension means adapted to force the bail into locking position.

In testimony whereof I affix my signature in presence of two witnesses.

JOHN V. CIZEK.

Witnesses:
F. J. HUSAK,
G. F. CHALUPSKY.

Copies of this patent may be obtained for five cents each, by addressing the "Commissioner of Patents, Washington, D. C."